(12) United States Patent
Kim

(10) Patent No.: US 8,570,628 B2
(45) Date of Patent: Oct. 29, 2013

(54) THREE-DIMENSIONAL COLOR DISPLAY APPARATUSES AND METHODS

(75) Inventor: Ji-deog Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 809 days.

(21) Appl. No.: 12/461,845

(22) Filed: Aug. 26, 2009

(65) Prior Publication Data

US 2010/0060958 A1 Mar. 11, 2010

(30) Foreign Application Priority Data

Sep. 8, 2008 (KR) .................. 10-2008-0088471

(51) Int. Cl.
*G02B 5/32* (2006.01)
*G02B 26/10* (2006.01)

(52) U.S. Cl.
CPC .................................. *G02B 26/106* (2013.01)
USPC ............................................... 359/17; 359/32

(58) Field of Classification Search
USPC .................... 359/1, 13–18, 22–26, 29, 32–33
See application file for complete search history.

(56) References Cited

U.S. PATENT DOCUMENTS

| | | | |
|---|---|---|---|
| 6,233,071 B1 | 5/2001 | Orr et al. | |
| 6,266,167 B1 * | 7/2001 | Klug et al. | 359/12 |
| 8,238,006 B2 * | 8/2012 | Kim | 359/17 |

FOREIGN PATENT DOCUMENTS

| | | |
|---|---|---|
| DE | 198 37 425 A1 | 3/2000 |
| EP | 2 034 340 A2 | 3/2009 |
| EP | 2 034 340 A3 | 3/2009 |
| KR | 10-1999-0086614 | 12/1999 |
| KR | 10-2000-0038879 | 7/2000 |
| KR | 10-2001-0087984 | 9/2001 |
| KR | 10-2003-0077264 | 10/2003 |
| KR | 10-2009-0024405 | 3/2009 |
| WO | WO 2005/120084 A2 | 12/2005 |
| WO | WO 2005/120084 A3 | 4/2006 |

OTHER PUBLICATIONS

Abstract of KR 10-0218324 published Nov. 16, 2000.
Extended European Search Report dated Dec. 28, 2009, issued in corresponding European Application No. 09168926.05-2217.

* cited by examiner

*Primary Examiner* — Derek S Chapel
(74) *Attorney, Agent, or Firm* — Harness, Dickey & Pierce P.L.C.

(57) ABSTRACT

A three-dimensional (3D) color display apparatus may include: light sources emitting different color beams; a volume diffractive element, in which a hologram is recorded using one of the color beams that is emitted from one of the light sources as a reference beam and a signal beam, displaying color images by diffracting the color beams emitted from the light sources; and a scanning unit scanning the color beams diffracted by the volume diffractive element. A 3D color image display method may include: recording holograms in a volume diffractive element using a first color beam as a reference and signal beam; irradiating the first color beam and another color beam onto the volume diffractive element as a reproducing reference beam; forming beam spots by diffracting the first color beam and the another color beam using the volume diffractive element; and scanning the color beams diffracted by the volume diffractive element.

20 Claims, 12 Drawing Sheets

$\delta_z = 0$
$\delta_y < 0$

THREE-DIMENSIONAL COLOR DISPLAY APPARATUSES AND METHODS

CROSS-REFERENCE TO RELATED APPLICATION(S)

This application claims priority from Korean Patent Application No. 10-2008-0088471, filed on Sep. 8, 2008, in the Korean Intellectual Property Office (KIPO), the entire contents of which are incorporated herein by reference.

BACKGROUND

1. Field

Example embodiments relate to three-dimensional (3D) color display apparatuses using a volume hologram. Also, example embodiments relate to 3D color display methods.

2. Description of the Related Art

Among methods of displaying 3D images, a 3D scanning method, a holographic method, and/or a stereoscopic method may be well known in the art. According to the holographic method, an interferogram may be formed in a photosensitive material using a reference beam and an object beam with coherence to form a 3D image. When the reference beam is irradiated onto the 3D image, the object beam may be restored to display the 3D image. According to the holographic method, a coherent light source may be required and it may be difficult to record/reproduce a large object located far away. According to the stereoscopic method, two two-dimensional (2D) images having a binocular disparity may be respectively viewed by left and right eyes of a viewer, thereby making the image stereoscopic. According to the stereoscopic method, two plane images may be used, and thus, it may be easy to realize a 3D image and/or to display the 3D image having a high resolution. However, since the stereoscopic method only uses a horizontal parallax, it may be difficult to realize a 3D image having both a horizontal parallax and a vertical parallax.

On the other hand, according to the 3D scanning method, a beam emitted by a light source may be directly modulated in order to improve optical efficiency and/or contrast of the image. In a 3D image displaying apparatus using the 3D scanning method, point scanning may be realized in a 3D manner, or an image may be scanned in a 2D manner in x- and y-directions using a spatial light modulator and the image may be realized in the 3D manner by moving a focus in a z-direction. When the 3D scanning method is performed using a 2D spatial light modulator, the scanning may be performed at high speed; however, fabrication costs may increase. On the other hand, the point scanning method may be inexpensive and may require only simple equipment. Point scanning may be realized only when one-dimensional optical modulation can be performed in a proceeding direction of the light beam.

SUMMARY

Example embodiments may include displays for displaying 3D full color images using a volume hologram.

Example embodiments also may include methods of displaying 3D full color images using a volume hologram.

According to example embodiments, a 3D color display apparatus may include: a plurality of light sources emitting different color beams; a volume diffractive element, in which a hologram is recorded using one of the color beams that is emitted from one of the plurality of light sources as a reference beam and a signal beam, displaying color images by diffracting the color beams emitted from the plurality of light sources; and/or a scanning unit scanning the color beams diffracted by the volume diffractive element.

According to example embodiments, a 3D color image display method may include: recording holograms in a volume diffractive element using a first color beam as a reference beam and a signal beam; irradiating the first color beam and another color beam that is different from the first color beam onto the volume diffractive element as a reproducing reference beam; forming beam spots by diffracting the first color beam and the another color beam using the volume diffractive element; and/or scanning the color beams diffracted by the volume diffractive element.

BRIEF DESCRIPTION OF THE DRAWINGS

The above and/or other aspects and advantages will become more apparent and more readily appreciated from the following detailed description of example embodiments taken in conjunction with the accompanying drawings, in which.

DETAILED DESCRIPTION

Figure 1:
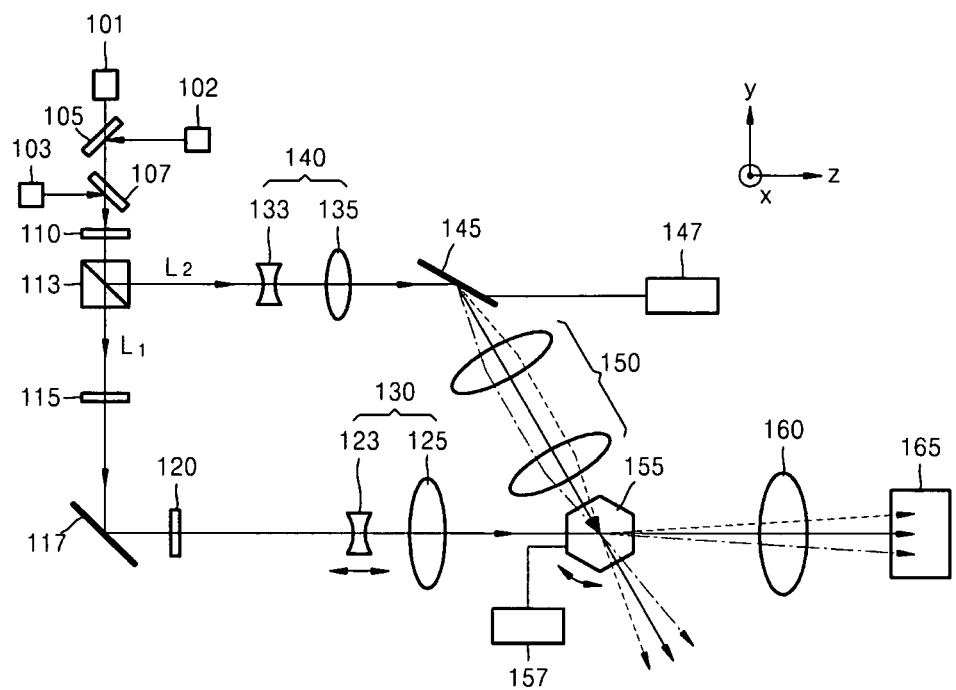
FIG. 1 is a diagram of a 3D color display apparatus according to example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

A 3D color display apparatus according to example embodiments may display 3D color images by performing a scanning operation using a volume diffractive element.

The volume diffractive element may include a hologram that was previously formed, and/or may diffract a reference beam emitted from a light source to reproduce a signal beam. In addition, a scanning method may be adopted to display 3D images.

FIG. 1 is a diagram of a 3D color display apparatus according to example embodiments. The 3D color display apparatus of example embodiments may include a plurality of light sources, that emit different color beams, and/or a volume diffractive element 155 diffracting the beams emitted from the plurality of light sources. Each of the plurality of light sources may be a light source having a light emission point or the plurality of light sources may have an array structure. In FIG. 1, each of the light sources may include a light emission point.

For example, the plurality of light sources may include a first light source 101 emitting a first color beam, a second light source 102 emitting a second color beam, and/or a third light source 103 emitting a third color beam. In addition or in the alternative, the first color beam may be a green beam, the second color beam may be a red beam, and/or the third color beam may be a blue beam. The first, second, and third color beams may proceed along different paths, and thus, various units for making the first through third color beams proceed along a single optical path may be included. For example, the first through third color beams proceeding along different optical paths may proceed along one optical path by using a first half-mirror 105 and a second half-mirror 107.

The first through third color beams may be reflected by and/or transmitted through a polarized beam splitter 113 according to polarized directions of the polarized beam splitter 113. A beam transmitted through the polarized beam splitter 113 may proceed along a first optical path L1 and/or may be used as a beam for recording a hologram in the volume diffractive element 155. A beam reflected by the polarized beam splitter 113 may proceed along a second optical path L2 and/or may be used to reproduce a signal recorded in the volume diffractive element. An optical path converter 117, for example, a mirror, and/or a first beam expander 130 for expanding a cross-section of the beam may be disposed on the first optical path L1 between the polarized beam splitter 113 and the volume diffractive element 155. In addition or in the alternative, a second beam expander 140 for expanding the cross-section of the beam and/or a scanning unit (not shown) for scanning the first through third color beams may be disposed on the second optical path L2 between the polarized beam splitter 113 and the volume diffractive element 155. The first beam expander 130 may include a first concave lens 123 and/or a first convex lens 125. The second beam expander 140 may include a second concave lens 133 and/or a second convex lens 135.

A half-wave plate 120 may be disposed between the polarized beam splitter 113 and the volume diffractive element 155. The half-wave plate 120 may change the polarized direction by 90° so that the polarized direction of the corresponding light beam may coincide with that of the reference beam. The half-wave plate 120 may be selectively disposed at a position between the polarized beam splitter 113 and the volume diffractive element 155. In addition or in the alternative, a first shutter 110 may be disposed between a second half-mirror 107 and the polarized beam splitter 113, and/or a second shutter 115 may be disposed between the polarized beam splitter 113 and the optical path converter 117. The first shutter 110 may selectively transmit the beams emitted from the first through third light sources. The second shutter 115 may be used to block the object beam incident to the volume diffractive element 155 when the recorded hologram is reproduced.

The scanning unit may be used for scanning the light beams emitted from the light sources in a first direction, a second direction, and/or a third direction. The first through third directions may be perpendicular to each other (e.g., orthogonal). For example, the first direction may be the proceeding direction of the beam that is diffracted by the volume diffractive element 155, that is, a z-direction in FIG. 1. The second direction may be perpendicular to the ground, that is, an x-direction in FIG. 1. The third direction may be parallel to the ground, that is, a y-direction in FIG. 1. The unit for scanning the beam in the first, second, and/or third directions may vary. For example, the scanning unit may include a two-dimensional (2D) mirror 145 disposed on the second optical path L2, as shown in FIG. 1. The 2D mirror 145 may perform the scanning operation by two-axis rotation, that is, the rotation may change an angle between the reference beam and the signal beam (a first rotation about the x-axis) and/or may have a rotation axis perpendicular to the above rotation axis (a second rotation about the y-axis). When the 2D mirror 145 changes the angle between the reference beam and the signal beam, scanning of the beam in the z-direction may be performed. When the 2D mirror 145 rotates perpendicularly, scanning of the beam in the x-direction may be performed. A first driver 147 for rotating the 2D mirror 145 may be used. In addition, the scanning of the beam in the y-direction may be performed by rotating the volume diffractive element 155 about the x-axis. A second driver 157 may be used to rotate the volume diffractive element 155. As shown in FIG. 1, a lens arrangement 150 may be disposed between the 2D mirror 145 and the volume diffractive element 155. A lens 160 for focusing the light beam diffracted by the volume diffractive element 155 onto a screen 165 may be located next to the volume diffractive element 155. The lens 160 may be, for example, a Fourier lens or an f-θ lens.

Next, processes of fabricating a diffractive element using a volume hologram when the light source is a one-dimensional array light source will be described.

Figure 2A:
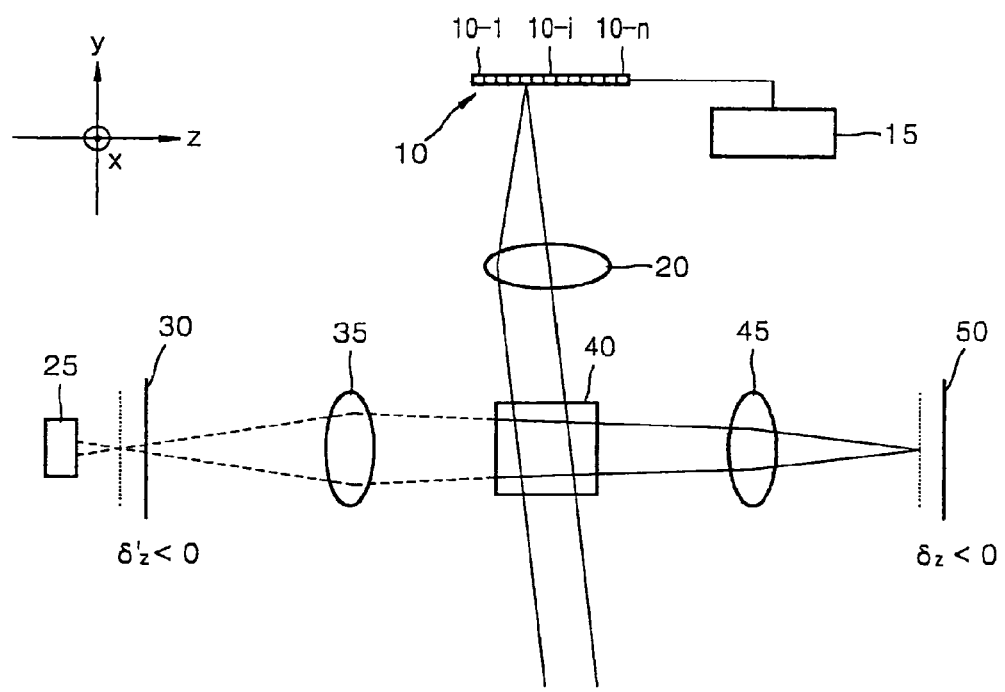
FIGS. 2A through 2C are diagrams illustrating a scanning operation in a first direction in the 3D color display apparatus according to example embodiments.
Figure 2B:
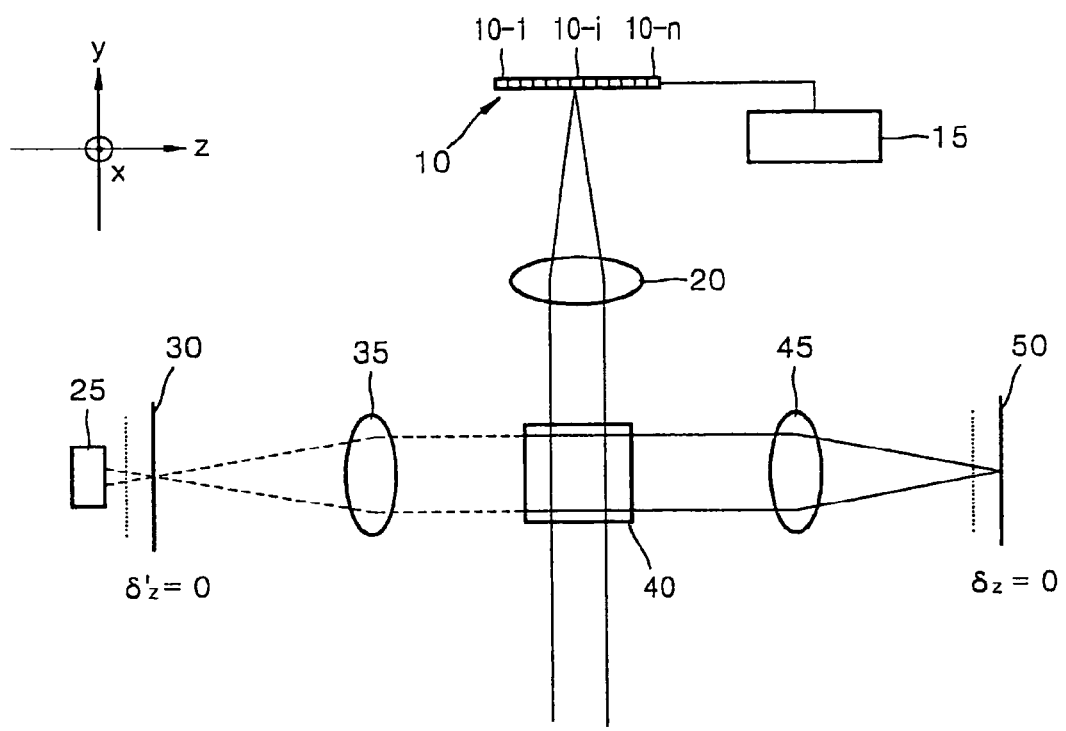
Figure 2C:
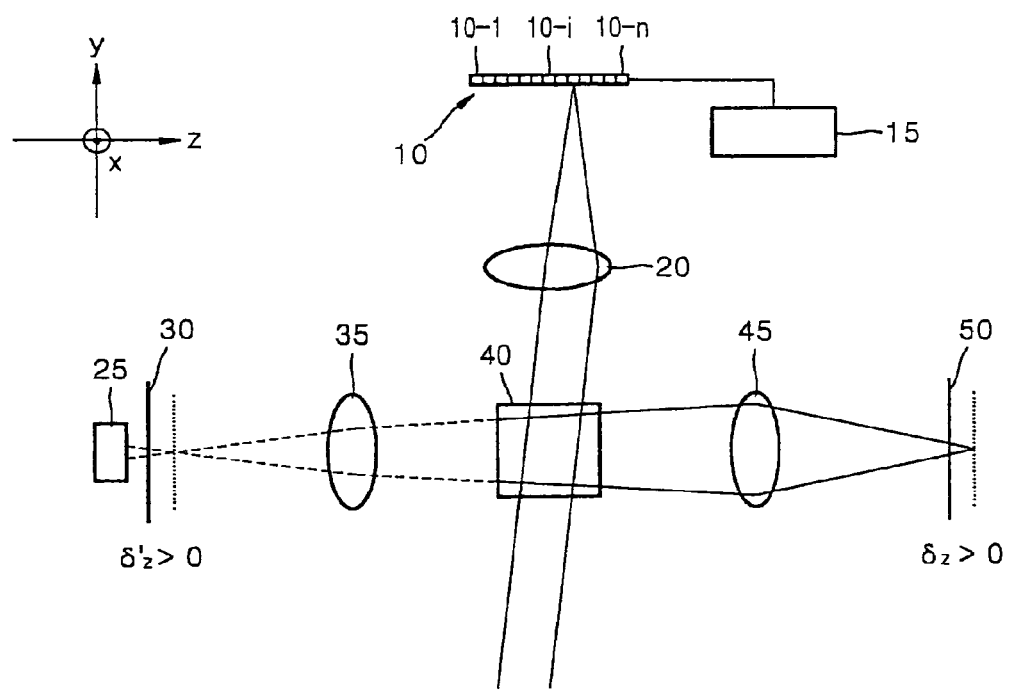

FIGS. 2A through 2C are diagrams illustrating a scanning operation in a first direction in the 3D color display apparatus according to example embodiments.

Referring to FIG. 2A, based on a volume diffractive element 40, a light source unit 25 generating signal beams having different spot positions may be disposed on a side of the volume diffractive element 40, and/or a light source 10 formed as a light source array may be disposed on another side of the volume diffractive element 40. The volume diffractive element 40 may have a hexagonal cross section. Beams emitted from the light source unit 25 and/or the light source 10 may be incident onto neighboring surfaces of the volume diffractive element 40. A first Fourier lens 35 may be disposed between the light source unit 25 and the volume diffractive element 40. In addition or in the alternative, a lens 20 may be disposed between the light source 10 and the volume diffractive element 40. The volume diffractive element 40 may be separated from the first Fourier lens 35 by a distance as long as a focal length of the first Fourier lens 35.

The light beam emitted from the light source 10 may operate as a reference beam. The object beam from the light source unit 25 and the reference beam from the light source 10 may interfere with each other to record a hologram in the volume diffractive element 40. The hologram may be formed in the volume diffractive element 40, for example, by changing the position of the beam spot of the beam emitted from the light source unit 25 and turning on/off each of light emission points 10-1, 10-2, through to 10-$n$ of the light source 10. For example, the beam spot of the beam emitted from the light source unit 25 may be located on a left side of the drawing (FIG. 2A) based on a reference surface 30, may be located on the reference surface 30 (FIG. 2B), or may be located on a right side of the drawing (FIG. 2C) based on the reference surface 30. In addition or in the alternative, each of the light emission points of the light source 10, which corresponds to each of the beam spots, may be turned on to record the hologram in the volume diffractive element 40. When it is assumed that the position of the light source unit 25, where a beam spot is formed on the reference surface 30, is a reference point (δ'z=0), the light source unit 25 may be moved by as much as δ'z (δ'z<0) from the reference point to the left side. Then, the beam emitted from the light source unit 25 and the beam emitted from the light source 10 may interfere with each other, and the interference signal of the two beams may be recorded in the volume diffractive element 40. Here, coherence between the two beams may be maintained.

Referring to FIGS. 2A through 2C, a first hologram formed due to the interference between the beam spot formed at the position δ'z<0 and a first reference beam corresponding to the beam spot, a second hologram formed due to the interference between the beam spot formed at the position δ'z=0 and a second reference beam corresponding to the beam spot, and/or a third hologram formed due to the beam spot formed at the position δ'z>0 and a third reference beam corresponding to the beam spot may be recorded in the volume diffractive element 40. The above volume diffractive element 40 may be fabricated in various ways and is not limited to the above-described method.

The volume diffractive element may be a volume hologram element, and/or may be formed of a photorefractive crystal, a photorefractive polymer, or an optical polymer. When the reference beam is irradiated onto the volume diffractive element 40 in which the hologram is recorded, the object beam (or signal beam) may be reproduced. That is, when the beam is irradiated onto the volume diffractive element 40 from one of the light emission points in the light source 10, the object beam corresponding to the irradiated light beam may be diffracted by the volume diffractive element 40 and/or may be reproduced. When all of the light emission points in the light source 10 are turned on, the light beams emitted from the light source 10 may be diffracted by the volume diffractive element 40 and/or beam spots may be formed at different positions from each other in the beam proceeding direction (the z-direction). When the light source for emitting the first reference beam is turned on, the reference beam may be diffracted by the volume diffractive element 40 according to the volume hologram principle and/or the signal beam may be reproduced at a position separated by as much as δz<0 from a reference surface 50 that is at the position δz=0, as shown in FIG. 2A. When the light source for emitting the second reference beam is turned on, the signal beam may be reproduced at a position δz=0 as shown in FIG. 2B. In addition or in the alternative, when the light source for emitting the third reference beam is turned on, the signal beam may be reproduced at a position separated by as much as δz>0 from the reference surface 50. As described above, the light beam may be directly modulated in the proceeding direction of the beam (the z-direction) by controlling the turning on/turning off of the light sources in the light source 10. Therefore, the one-dimensional scanning of the light beam in the beam proceeding direction may be performed.

Distances between the neighboring light emission points in the light source may be determined according to characteristics of a volume diffractive element so that there may be no cross-talk between the beams, spots of which are located on the z-axis, incident to the volume diffractive element at the same time. When it is assumed that a minimum angle which can be angular multiplexed in the beam proceeding in the z-direction is Δα, then the minimum distance Δz between the light emission points may be determined as Δz=fΔα. Here, α may denote an angle between a reference beam and an object beam, and f may denote a focal length of the lens 20.

In addition or in the alternative, a second Fourier lens 45 may be disposed between the volume diffractive element 40 and the reference surface 50. The second Fourier lens 45 may focus the signal beam reproduced by the volume diffractive element 40.

In example embodiments, the light beam may be scanned in the first, second, and/or third directions in order to display 3D images. For example, the light beams emitted from the light emission points 10-1, through to 10-$i$, through to 10-$n$ may be diffracted by the volume diffractive element 40 so that the beam spots may be formed on different positions from each other, and then the beams may be scanned in the first direction. In addition or in the alternative, the light source 10 may be driven to scan the beams in the second direction, and then the volume diffractive element 40 may be driven to scan the beams in the third direction.

Here, the beam proceeding direction toward the reference surface 50 may be denoted as the z-direction, and the directions that are perpendicular to the z-direction may be denoted as the x-direction and the y-direction. For example, the first direction may be the z-direction, the second direction may be the x-direction, and/or the third direction may be the y-direction.

Figure 3A:
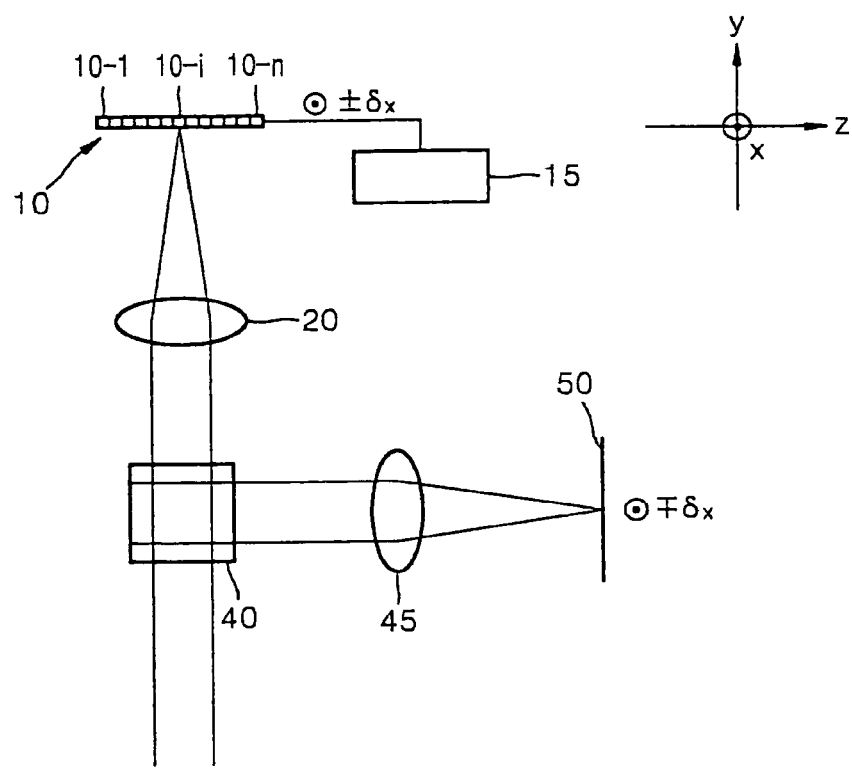
FIG. 3A is a diagram illustrating a scanning operation in a second direction in the 3D color display apparatus according to example embodiments.
Figure 3B:
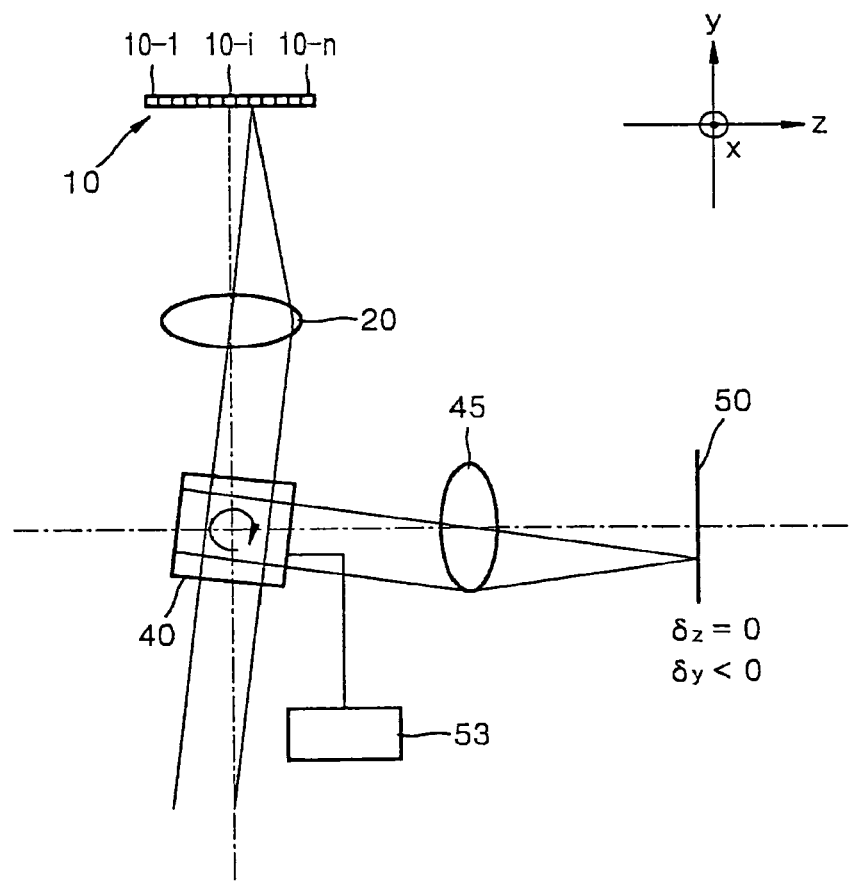
FIG. 3B is a diagram illustrating a scanning operation in a third direction in the 3D color display apparatus according to example embodiments.

Next, FIG. 3A is a diagram illustrating a scanning operation in a second direction in the 3D color display apparatus according to example embodiments, while FIG. 3B is a diagram illustrating a scanning operation in a third direction in the 3D color display apparatus according to example embodiments.

FIG. 3A shows scanning in a direction perpendicular to the ground (the x-direction). FIG. 3B shows scanning in a direction parallel with the ground (the y-direction). The light source 10 may be driven in ±x-directions using a first driver 15 to scan the beam in the x-direction. In addition or in the alternative, in the z-direction, the beam may be directly modulated by controlling the turning on/turning off of the light sources in the light source 10. In FIG. 3A, when the light source is moved by as much as δx in the x-direction, the signal beam may be reproduced according to characteristics of the volume hologram and/or the beam spot may be moved by as much as −δx.

In addition or in the alternative, the volume diffractive element 40 may be rotated using a second driver 53 to perform the scanning in the y-direction. The volume diffractive element 40 may be rotated about the x-axis on a plane formed by the y-axis and the z-axis (e.g., the yz plane). In FIG. 3B, when the volume diffractive element 40 is rotated about the x-axis, the position of the spot may be moved horizontally in the y-direction behind the second Fourier lens 45. In this case, when the reference beam is irradiated from the same position as the position before rotating the volume diffractive element 40, the incident angle of the reference beam onto the volume diffractive element 40 may be changed due to the rotation of the volume diffractive element 40. When the incident angle of the reference beam onto the volume diffractive element 40 is changed, the beam spot may be formed on a different position in the depth direction, that is, the beam proceeding direction (the z-direction). That is, when the volume diffractive element 40 is rotated in order to perform the scanning operation in the horizontal direction (the y-direction), the spot position in the depth direction may be changed. Therefore, during the scanning in the horizontal direction, the changed incident angle may be compensated according to the rotating angle of the volume diffractive element so that the spot is not moved in the depth direction (the z-direction).

Figure 4A:
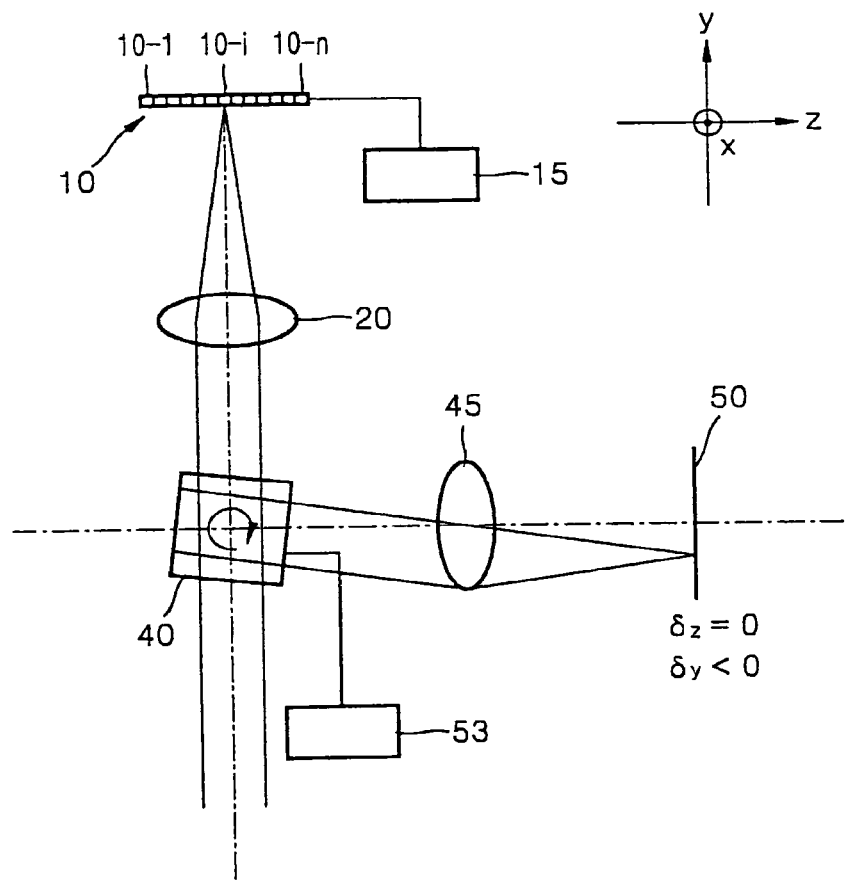
FIGS. 4A through 4C are diagrams illustrating compensation for changes in incident angle when the scanning operation is performed in the third direction in the 3D color display apparatus according to example embodiments.
Figure 4B:
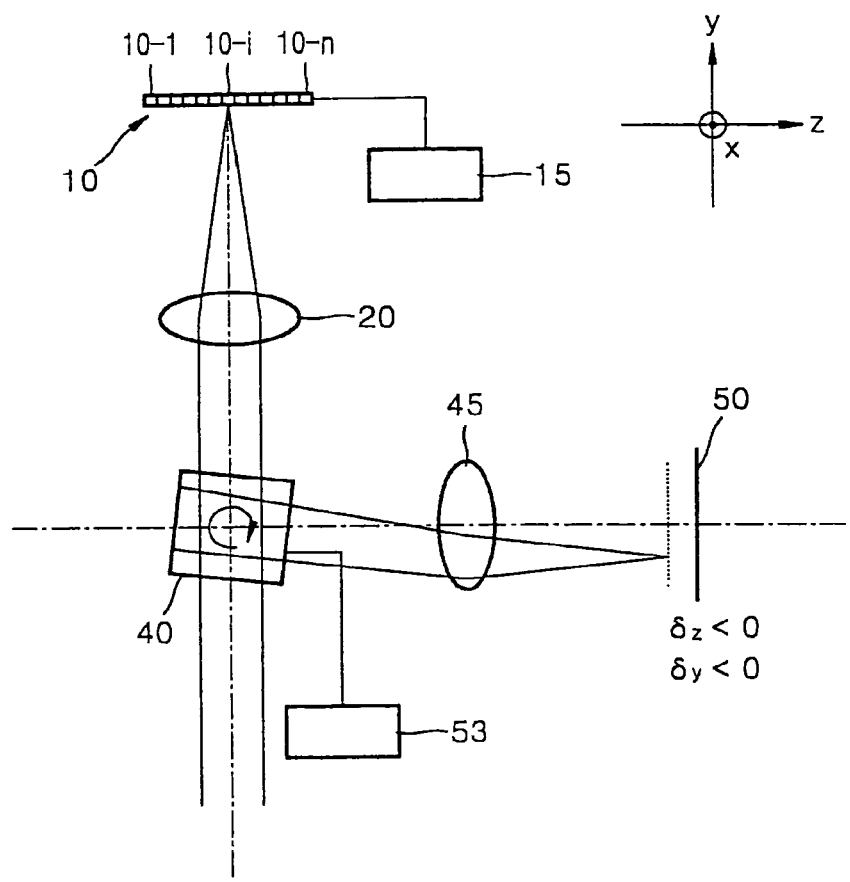
Figure 4C:
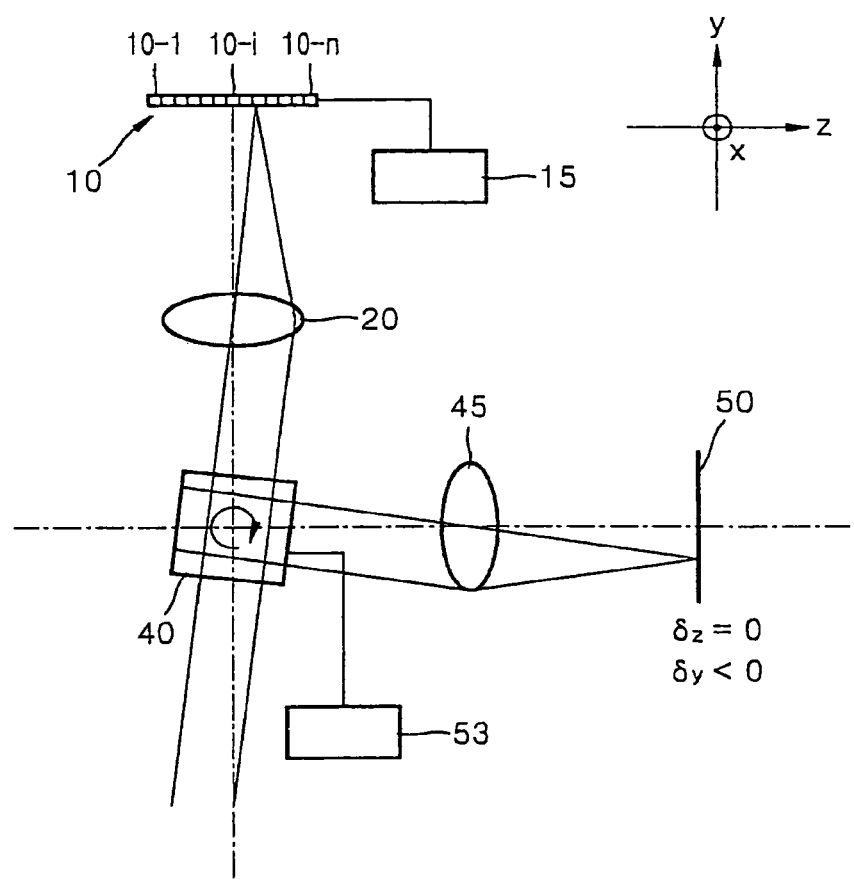

FIGS. 4A through 4C are diagrams illustrating compensation for changes in incident angle when the scanning operation is performed in the third direction in the 3D color display apparatus according to example embodiments. FIGS. 4A through 4C may show, for example, compensation of the incident angle of the beam incident to the volume diffractive element 40 during the scanning operation in the horizontal direction.

First, as shown in FIG. 2B, it may be assumed that the beam spot in the z-direction is at the reference surface 50 (δz=0). When the reference beam is emitted from a center point of the light source 10 and the volume diffractive element 40 is rotated in a clockwise direction in the drawing, the proceeding direction of the beam generated by the volume diffractive element 40 may be changed according to the rotation of the volume diffractive element 40 as shown in FIG. 4A, and/or the beam spot may be located at a position where δz=0 and δy<0 when the beam passes through the second Fourier lens 45. However, when the volume diffractive element 40 is rotated, the incident angle of the reference beam, which is emitted from the light source 10 and passes through the lens 20 into the volume diffractive element 40, may be changed, and thus, the beam spot may actually be formed at the position where δz<0 and δy<0, as shown in FIG. 4B, in consideration of the incident angle of the reference beam incident to the volume diffractive element 40. Therefore, in order to perform the scanning operation in the y-direction when the beam spot is located at the position where δz=0, the location the light source point emitting the reference beam in the light source 10 may be compensated according to the rotating angle of the volume diffractive element 40, as shown in FIG. 4C. That is, the light source that is turned on may be changed from the center point to the light source on the right side of the light source 10 so that δz can be maintained as 0. When horizontal scanning is performed by rotating the volume diffractive element 40, the position of the reference beam incident to the volume diffractive element 40 may be changed to compensate the incident angle of the reference beam with respect to the volume diffractive element 40 in order not to change the value of δz. Therefore, the scanning in the horizontal direction (the y-direction) may be performed by rotating the volume hologram without changing the value of δz.

When the volume diffractive element 40 is fabricated, the hologram may be recorded using the beam having a wavelength to which the material of the volume diffractive element 40 actively reacts. When the beam used in reproducing the signal has the same wavelength as that of the beam used in recording the signal, the signal recorded in the volume diffractive element 40 may be reproduced. However, when the wavelength of the beam incident to the volume diffractive element 40 in the reproducing operation is different from that of the beam incident to the volume diffractive element 40 in the recording operation, the signal may be reproduced by compensating the incident angle of the beam incident to the volume diffractive element 40 so as to satisfy Bragg matching conditions. According to example embodiments, the 3D color images may be displayed using one volume diffractive element without having to fabricate a volume diffractive element for each color.

Figure 5A:
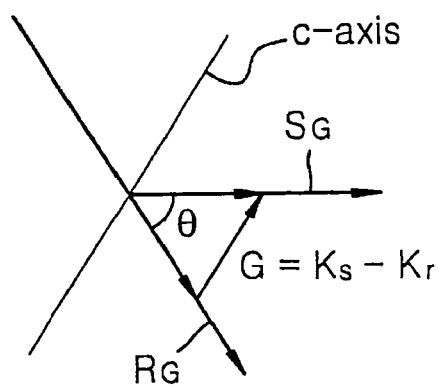
FIGS. 5A through 5C are diagrams illustrating a method of displaying 3D color images according to example embodiments.
Figure 5B:
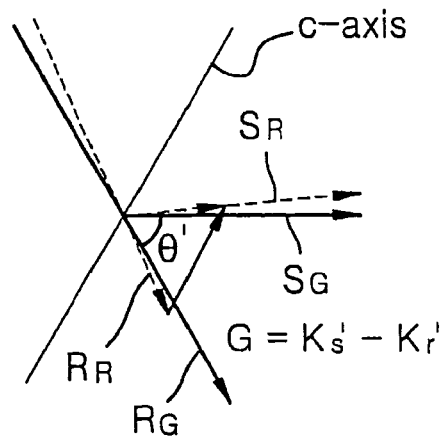
Figure 5C:
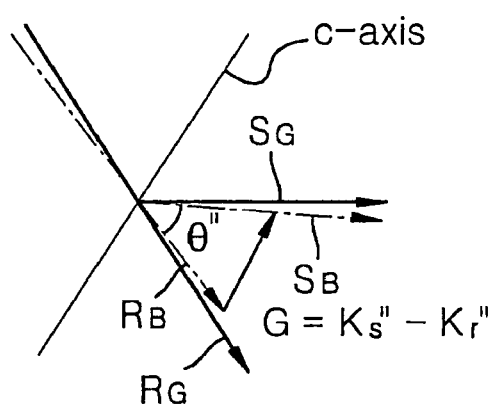

FIGS. 5A through 5C are diagrams illustrating a method of displaying 3D color images according to example embodiments.

Referring to FIG. 5A, in a case where the hologram is recorded using a green beam, when it is assumed that a wave vector of the signal beam is $K_s$ and a wave vector of the reference beam is $K_r$, a grating vector G of the recorded hologram may be $K_s-K_r$. Here, an angle between the reference beam $R_G$ (or recording beam and reproducing beam) and the signal beam $S_G$ (or object beam) may be θ. The signal beam may not be represented by a constant wave vector, however, it may be assumed that the wave vector of the signal beam is a component of a plane wave that is a main component of the signal beam. It may be assumed that the wave vector of the signal beam comprises a plurality of ks when the wave vector of the signal beam cannot be approximated to the main component of the signal beam. A direction of the grating vector G may coincide with a c-axis of the recording medium of the volume diffractive element 40, for example, a photorefractive crystal.

FIG. 5B shows that a red beam may be diffracted by the recorded hologram. When the beam has a longer wavelength than that of the recording beam, that is the green beam, the wave vector may be less than that of the green beam and/or the grating vector G may not be changed. Therefore, as shown in FIG. 5B, an angle θ' between the signal beam $S_R$ and the reference beam $R_R$ may be greater than the angle θ shown in FIG. 5A. The angle θ' may be determined so as to satisfy equation $G=K_s'-K_r'$.

FIG. 5C shows that a blue beam may be diffracted by the recorded hologram. When the beam has a shorter wavelength than that of the recording beam, that is the green beam, the wave vector may be greater than that of the green beam, and thus, an angle θ" between the signal beam $S_B$ and the reference beam $R_B$ may be less than the angle θ shown in FIG. 5A, as shown in FIG. 5C. Here, the angle θ" may be determined so as to satisfy the equation $G=K_s''-K_r''$.

The incident angle of the reference beam (that may satisfy the Bragg matching conditions required for reproducing the hologram), which is recorded using the green beam, with the red beam or the blue beam, may be related to the angle θ between the green reference beam of the recording operation and the signal beam. The reference beam and the signal beam may be incident nearly perpendicular to a surface of the volume diffractive element. Therefore, the angle θ between the green reference beam and the signal beam may be related to an angle between the surface of the volume diffractive element, on which the reference beam and the signal beam are incident, and a normal line of the incident surface. Consequently, the incident angle that satisfies the Bragg matching conditions required for reproducing the hologram, that is recorded using the green beam, with the red beam or the blue beam, may be related to the angle between the normal lines of the incident surfaces of the volume diffractive element. In addition or in the alternative, the incident angle that may satisfy the Bragg matching conditions may be reduced when the angle θ between the reference beam and the signal beam of the green beam is reduced. When the incident angle satisfying the Bragg matching conditions becomes greater, the angles θ' and θ" may be increased, and accordingly, the beam spots of the red beam and the blue beam may be separated far from the beam spot of the green beam. The beam spots of the red beam and the blue beam may be as close to the beam spot of the green beam as possible in order to form the colors.

For example, the beam spot of the green beam may be formed at the position where δy=0 in the y-direction, and/or the beam spots of the red beam and/or the blue beam, which satisfy the Bragg matching conditions, may be respectively formed at positions where δy>0 and δy<0. However, when the incident angles of the red beam and/or the blue beam satisfying the Bragg matching conditions increase, the beam spots of the red beam and the blue beam may be farther from the beam spot of the green beam, that may be formed at the position δy=0. When the beam spots of the red beam and/or the blue beam are close to the beam spot of the green beam, the colors may be realized by mixing the three beam spots. According to example embodiments, the angle θ between the wave vector $K_s$ of the signal beam and the wave vector $K_r$ of the reference beam may be reduced to realize the colors. In order to coincide the beam spots, which vary from the colors, the positions of the beam spots y, which are differentiated by colors, may be matched.

Figure 6:
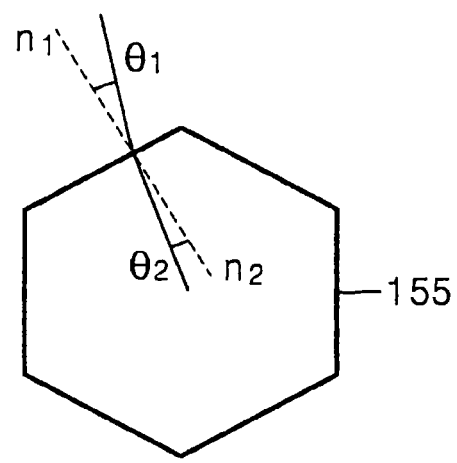
FIG. 6 is a diagram showing diffraction of an incident beam at an incident surface of the volume diffractive element in the 3D color display apparatus according to example embodiments.

FIG. 6 is a diagram showing diffraction of an incident beam at an incident surface of the volume diffractive element in the 3D color display apparatus according to example embodiments. The angles θ, θ', and θ" shown in FIGS. 5A, 5B, and 5C are angles in the medium of the volume diffractive element, and the angle of the reference beam incident to the volume diffractive element may be set in consideration of the refraction at the incident surface. A refractive index $n_2$ of the photorefractive crystal, that may be generally used to form the volume diffractive element, may be 2 or more, which is greater than the refractive index $n_1=1$, and thus, the angle $\theta_1$ may be greater than the angle $\theta_2$ in FIG. 6.

Figure 7:
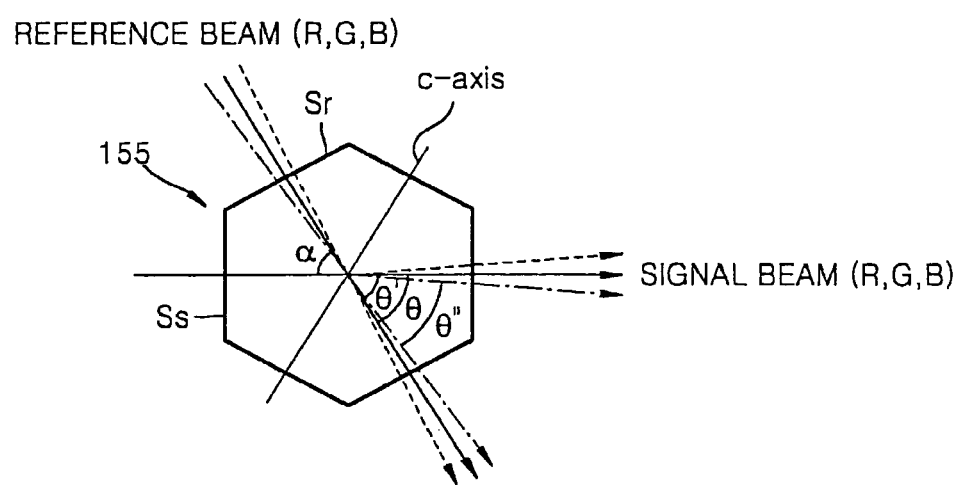
FIG. 7 is a diagram schematically showing a relationship between a reference beam incident into the volume diffractive element in the 3D color display apparatus according to example embodiments and a reproduced signal beam.

FIG. 7 is a diagram schematically showing a relationship between a reference beam incident into the volume diffractive element in the 3D color display apparatus according to example embodiments and a reproduced signal beam. In FIG. 7, the volume diffractive element has a hexagonal cross-section and the refraction occurring at the incident surface when the reference beam is incident to the volume diffractive element is omitted. The angle θ between the wave vector $K_s$ of the signal beam and the wave vector $K_r$ of the reference beam may be related to an angle α between the normal line of the incident surface $S_r$, to which the reference beam is incident, and the normal line of the incident surface $S_s$, to which the signal beam is incident. In addition, when the angle α is reduced, the beam spots of the red beam and/or the blue beam may become closer to the beam spot of the green beam. According to example embodiments, the angle α may be adjusted by changing the cross-section of the volume diffractive element. For example, the volume diffractive element may have a polygonal cross-section, for example, a rectangular cross-section or a cross section having a greater number of corners, so that the angle α may be 90° or less. In order to reduce the angle α, the reference beam and the signal beam may be incident to neighboring surfaces of the volume diffractive element.

The cross-section of the volume diffractive element may be a polygon having an even number of corners so that surfaces facing each other may be parallel to each other. In addition, the cross-section of the volume diffractive element may be a regular polygon. When the cross-section of the volume diffractive element is the polygon having an even number of corners, the beam spots of the element colors may become closer when the number of corners increases and/or the angle between the reference beam and the signal beam is reduced. However, a length is required for one side of the volume diffractive element in order to perform the horizontal scanning and/or angular multiplexing, and the number of corners in the volume diffractive element and the length of one side may be related (e.g., complementary) to each other when the size of the volume diffractive element is given.

On the other hand, the recorded hologram may be erased due to the reproducing beam, and thus, to prevent this, fixing process of the hologram may be performed.

According to example embodiments, 3D color images may be displayed using one volume diffractive element. Therefore, there may be no need to fabricate an additional volume diffractive element for each color.

While example embodiments have been particularly shown and described, it will be understood by those of ordinary skill in the art that various changes in form and details may be made therein without departing from the spirit and scope of the present invention as defined by the following claims.

What is claimed is:

1. A three-dimensional (3D) color display apparatus, comprising:
   a plurality of light sources configured to emit different color beams;
   a volume diffractive element, in which a hologram is recorded using one of the color beams that is emitted from one of the plurality of light sources as a reference beam and a signal beam, configured to display color images by diffracting the color beams emitted from the plurality of light sources; and a scanning unit configured to scan the color beams to be diffracted or being diffracted by the volume diffractive element;

wherein each of the plurality of light sources comprises light emission points having an array structure, and wherein a light beam from the plurality of light sources is directly modulated in a propagating direction of the light beam by controlling turning on or turning off of the light emission points.

2. The 3D color display apparatus of claim 1, wherein the volume diffractive element has a polygonal cross-section having a shape of a hexagon or a shape having a greater number of corners than a hexagon.

3. The 3D color display apparatus of claim 1, wherein the volume diffractive element has a polygonal cross-section having an even number of corners.

4. The 3D color display apparatus of claim 1, wherein the color beams emitted from the plurality of light sources are incident to the volume diffractive element so as to satisfy Bragg matching conditions.

5. The 3D color display apparatus of claim 1, wherein the scanning unit comprises a double-axial rotating mirror disposed between the plurality of light sources and the volume diffractive element.

6. The 3D color display apparatus of claim 1, wherein the scanning unit comprises a driver for rotating the volume diffractive element.

7. The 3D color display apparatus of claim 1, wherein a beam from the volume diffractive element is scanned using a phase conjugated hologram method.

8. The 3D color display apparatus of claim 1, further comprising:

a beam expander expanding cross-sections of the different color beams emitted from the plurality of light sources.

9. The 3D color display apparatus of claim 1, wherein the reference beam and the signal beam are incident to surfaces of the volume diffractive element, and wherein the surfaces are neighboring surfaces.

10. The 3D color display apparatus of claim 1, further comprising:

a Fourier lens or an f-θ lens focusing the color beams diffracted by the volume diffractive element.

11. The 3D color display apparatus of claim 1, wherein the volume diffractive element is formed of a photorefractive crystal, a photorefractive polymer, or an optical polymer.

12. The 3D color display apparatus of claim 1, wherein the plurality of light sources form an array structure.

13. A three-dimensional (3D) color image display method, comprising:

recording a hologram in a volume diffractive element using a first color beam from a first light source as a reference beam and a signal beam;

irradiating the first color beam and another color beam that is different from the first color beam onto the volume diffractive element as a reproducing reference beam, wherein the another color beam is emitted by a second light source;

forming beam spots by diffracting the first color beam and the another color beam using the volume diffractive element; and scanning the color beams to be diffracted or being diffracted by the volume diffractive element;

wherein both the first light source and the second light source comprise light emission points having an array structure, and wherein the first color beam and the another color beam are directly modulated in a propagating direction of the first color beam and the another color beam by controlling turning on or turning off of the light emission points.

14. The 3D color image display method of claim 13, wherein the volume diffractive element has a polygonal cross-section having a shape of a hexagon or a shape having a greater number of corners than a hexagon.

15. The 3D color image display method of claim 13, wherein the volume diffractive element has a polygonal cross-section having an even number of corners.

16. The 3D color image display method of claim 13, wherein the first color beam and the another color beam are incident to the volume diffractive element so as to satisfy Bragg matching conditions.

17. The 3D color image display method of claim 13, wherein scanning the color beams comprises:

rotating the volume diffractive element.

18. The 3D color image display method of claim 13, wherein a beam from the volume diffractive element is scanned using a phase conjugated hologram method.

19. The 3D color image display method of claim 13, wherein the reference beam and the signal beam are incident to surfaces of the volume diffractive element, and wherein the surfaces are neighboring surfaces.

20. The 3D color image display method of claim 13, wherein scanning the color beams comprises:

changing an angle formed by the reference beam and the signal beam.

* * * * *